(12) United States Patent
Leuenberger et al.

(10) Patent No.: US 8,022,353 B2
(45) Date of Patent: Sep. 20, 2011

(54) SEED COUNTING AND FREQUENCY MEASUREMENT APPARATUS AND METHOD

(75) Inventors: Jacob Andreas Leuenberger, Basel (CH); Markus Roggli, Möriken (CH)

(73) Assignee: Syngenta Crop Protection LLC, Greensboro, NC (US)

( * ) Notice: Subject to any disclaimer, the term of this patent is extended or adjusted under 35 U.S.C. 154(b) by 517 days.

(21) Appl. No.: 11/816,462

(22) PCT Filed: Feb. 15, 2006

(86) PCT No.: PCT/EP2006/001357
§ 371 (c)(1),
(2), (4) Date: Jul. 10, 2008

(87) PCT Pub. No.: WO2006/087176
PCT Pub. Date: Aug. 24, 2006

(65) Prior Publication Data
US 2008/0265141 A1    Oct. 30, 2008

Related U.S. Application Data

(60) Provisional application No. 60/653,908, filed on Feb. 17, 2005.

(51) Int. Cl.
G06M 1/10        (2006.01)

(52) U.S. Cl. .................. 250/222.2; 250/223 R
(58) Field of Classification Search .............. 250/222.2, 250/224, 223 R; 356/442; 209/655; 377/6
See application file for complete search history.

(56) References Cited

U.S. PATENT DOCUMENTS

| 3,512,002 A | 5/1970 | Decker |
| 5,424,835 A * | 6/1995 | Cosnard et al. ............... 356/606 |
| 2008/0265141 A1* | 10/2008 | Leuenberger et al. ........ 250/216 |

FOREIGN PATENT DOCUMENTS

| CA | 2237943 C | 9/2001 |
| EP | 0550300 A | 7/1993 |

* cited by examiner

Primary Examiner — John Lee
(74) Attorney, Agent, or Firm — James Cueva (57) ABSTRACT

An improved device for measuring the count and frequency of seeds in a stream of seeds is described. The device is useful for measuring the frequency and accuracy of seed planting devices. A seed counting system can include an imaging region, an image sensing device, and a lens between the imaging region and the image sensing device. An optical distance extender between the imaging region and the lens, creates an effective optical distance between the imaging region and the lens that is substantially greater than the physical distance between the imaging region and the lens, thereby providing a substantial depth of field.

21 Claims, 11 Drawing Sheets

SEED COUNTING AND FREQUENCY MEASUREMENT APPARATUS AND METHOD

This application is a 371 of International Application No. PCT/EP2006/001357 filed Feb. 15, 2006, which claims priority to U.S. 60/653,908 filed Feb. 17, 2005, the contents of which are incorporated herein by reference.

FIELD OF THE INVENTION

The invention relates to devices and methods for determining a count and frequency of seeds in a stream of seeds, and more particularly relates to a compact device and method for accurately measuring the number and frequency of seeds or grains in a rapid and dispersed stream of seeds or grains as the seeds or grains are deposited by a seed planting device.

BACKGROUND

Seed planting devices are used to deposit or sew individual seeds from a batch of seeds. Such planting devices typically are mechanical devices mounted on or pulled behind a transport vehicle such as a tractor, and the planting devices dispense the seeds in rows as the vehicles traverse large fields. The rate at which individual seeds are dispensed from a planting device is correlated with the speed of movement of the transport vehicle. The deposition rates of seed planters are controlled by various types of metering devices, and are dependent on vehicle speed. For example, a planting device may be set to achieve a desired seed deposition rate as a vehicle traverses a field at about 10 km/hour. In practice, typical modern seed planters deposit individual seeds at a rate between about 10 and about 20 seeds per second. The ability of such planting devices to dispense seeds at a desired and substantially constant rate is critical to farmers and growers in order that a bulk quantity of seeds is evenly and properly distributed over a planting area to obtain a desired yield per acre. Accordingly, proper adjustment and calibration of seed planting devices is important to farmers and growers. In order to properly adjust and calibrate such a planting device, a need exists to properly measure the seed count and frequency in a stream of seeds as the seeds are dispensed from the seed planting device. Because of the rapid feed rates of seed planting devices, however, precise measurement can be difficult.

Seed producers commonly pre-treat seeds and grains before planting in order to enhance one or more attributes of the seeds or grains. Such seed treatments may include applying a treatment coating on the outer surfaces of each seed or kernel, for example. Some surface coating formulations may affect the planting accuracy or planting characteristics of conventional planting devices when such devices are used to plant the treated seeds. For example, treatment coatings may alter the natural surface roughness or smoothness of seeds, or may cause unwanted adhesion between seeds, thereby affecting the interaction between the treated seeds and seed planting devices. Therefore, there is a need to accurately assess the influence of particular seed treatments on the performance of planting devices such that optimal treatment formulations and coating processes can be identified, and such that optimal settings for planting devices can be known for specific types of treated seeds.

Others have explored various techniques and devices for determining the count and frequency of seeds in a stream of seeds. Such devices and methods are used to measure the quantity and frequency of seeds dispensed by a planting device. Such devices also are useful for calibrating and testing seed planting devices to ensure consistent and optimum performance. One such device is a moving grease belt that captures seeds as the seeds are deposited by a planting device. With such a device, the number and spacing of seeds or grains on the belt indicates the effective deposition rate. Unfortunately, grease belt counters are ineffective for measuring the feed rate of large numbers of samples.

Other known measuring devices include electronic measuring systems that utilize infrared sensors or the like to sense the passage of a seed, grain or kernel through a tube or chute as the seed is dispensed from the chute. Unfortunately, known electronic measurement devices typically use single light sensors having limited image-capturing capability. For example, such devices cannot effectively count the passage of two adjacent objects that pass by a sensor substantially simultaneously. In addition, funneling the particles through a narrow tube or chute for counting can influence the flow of particles being measured. Therefore, known electronic measuring devices are not sufficiently accurate, and are unable to provide a sufficiently precise measurement of planting frequency to ensure optimum performance of a seed planting device.

Therefore, there is a need for a seed planting measurement device and method that accurately measures the output quantity and frequency of seed planting devices. Such a device should have a counting accuracy of about 99 percent or greater, and should be capable of distinguishing seeds or grains from smaller dust particles or other small foreign matter commonly found mixed with seeds and grains. Such a device and method also should be capable of capturing data regarding planting frequency as seeds or grains are output directly from a planting device, and without the need for seeds to pass through a restrictive tube or funnel. In addition, the device and method should be capable of measuring the count and frequency of seeds and grains in a rapid stream of seeds or grains having substantial width and depth. For example, the device and method should be capable of counting seeds in a rapidly moving stream of seeds having a stream width and depth that is up to about sixty times greater than the average seed size. In addition, the device should be compact and portable for convenient use in the field.

SUMMARY

A compact seed counting system comprises an imaging region, an image sensor, a lens, and an optical distance extender. The optical distance extender is positioned between the imaging region and the lens. The optical distance extender effectively increases the optical distance between the imaging region and the lens such that the effective optical distance is substantially greater than the physical distance between the imaging region and the lens. This extended optical distance provides an enhanced depth of field for imaging seeds as the seeds pass through the imaging region.

In another embodiment, the invention includes a method of counting particles of a predetermined particle size in a stream of spaced particles having a stream width that is at least about ten times greater than the particle size. The method includes passing the stream of particles through an aperture having an aperture depth that is equal to or greater than the stream width. The method further includes capturing a substantially focused image of substantially every particle in the stream of particles as the stream of particles passes through the aperture, irrespective of the position of a particle within the aperture. In addition, the method includes analyzing the captured particle images to determine at least one characteristic of the stream of particles.

Another embodiment of the invention includes a compact seed counting apparatus comprising means for acquiring a substantially sharp image of a seed in a substantially dispersed stream of seeds having a mean axis of flow. The means for acquiring a substantially sharp image is capable of acquiring a substantially sharp image of each seed in the stream irrespective of the distance of a seed from the axis of flow.

A further embodiment of the invention includes a particle frequency measuring apparatus. The apparatus includes a housing having an aperture therein, an image sensor located on a first side of the aperture, and a light source on a second side of aperture opposite the first side. A lens focuses light from the light source onto the image sensor, and is positioned a first distance from the aperture. A pair of opposed mirrors between the lens and the aperture reflect light from the light source such that the light must travel a distance substantially greater than the first distance before reaching the lens.

DETAILED DESCRIPTION

Figure 1:
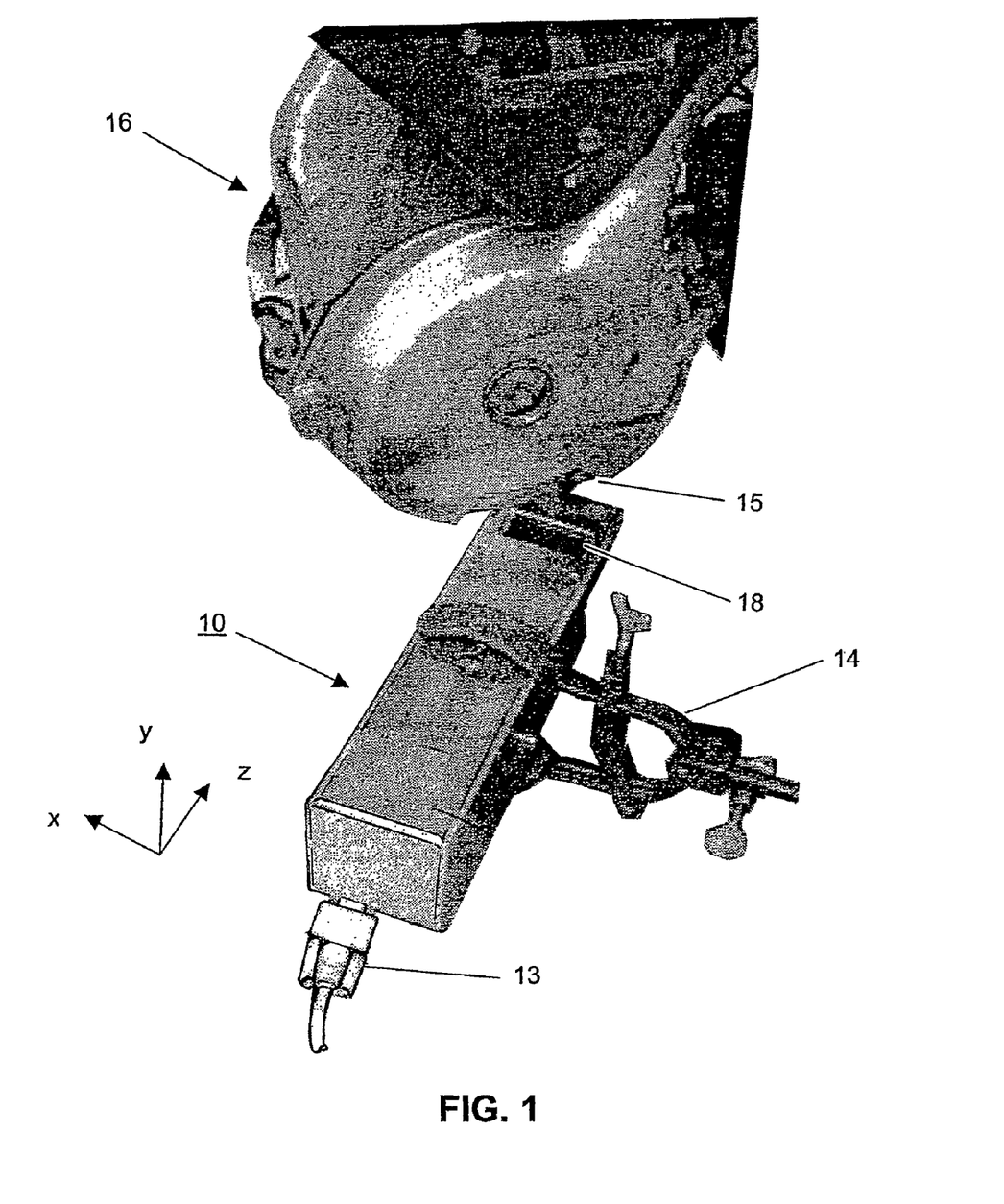
FIG. 1 is a perspective view of one embodiment of a measurement device according to the invention during measurement of seed distribution from a typical seed planting device.
Figure 2:
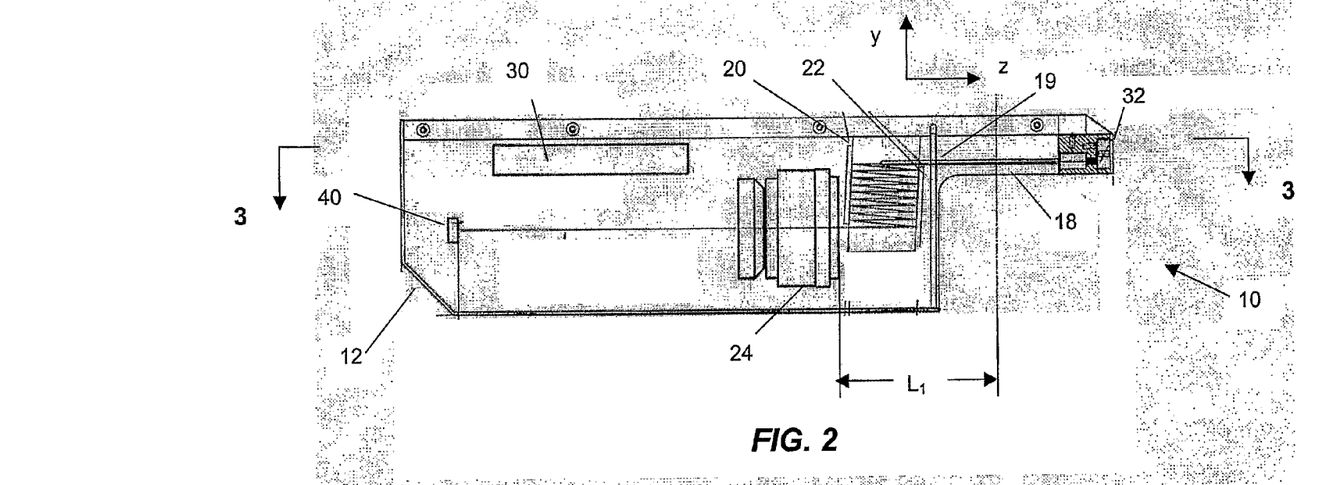
FIG. 2 is an elevation cross-sectional view of one embodiment of a measurement device according to the invention shown in FIG. 1 as taken along line 2-2 in FIG. 3.
Figure 3:
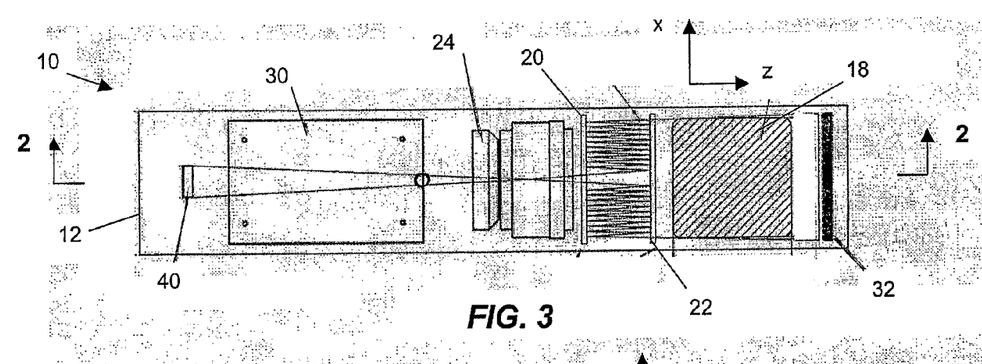
FIG. 3 is a top cross-sectional view of the measurement device of FIGS. 1 and 2 taken along line 3-3 in FIG. 2.

One embodiment of a seed counting and frequency measurement device 10 according to the invention is shown in FIGS. 1-3. In FIG. 1, the device 10 is positioned beneath a dispensing portion 16 of a typical seed planting device. During operation of the seed planting device 16, individual seeds exit the device 16 from a seed dispensing opening 15 at substantially constant intervals. The measurement device 10 is positioned beneath the dispensing opening 15 such that dispensed seeds fall through an aperture 18 defining a seed measurement area. The device 10 is fixed in position beneath the seed dispensing opening 15 by a clamp 14 or any other suitable support supporting means such as bolts or the like.

Measurement data collected by the measurement device 10 is communicated to a remote computer or the like by a serial communication cable 13. Alternatively, measurement data may be wirelessly communicated to a remote computer.

The measurement device 10 is suitable for counting and measuring the timing and frequency of a stream of seeds having a substantially uniform size. For example, the measurement device 10 is capable of counting and measuring the frequency of seeds or kernels as a the stream of seeds or kernels exits a seed planting device 16. As used herein, the term "seeds" shall mean a plurality of like seeds, grains, or kernels that have a substantially uniform size and are suitable for planting. Such seeds may include small seeds such as canola seeds having a mean diameter of about 1 mm, and large seeds such as kernels of corn or maize having a mean diameter of about 5 mm, for example.

As shown in FIGS. 2 and 3, the device 10 includes a housing 12. A seed-receiving aperture 18 extends through the a portion of the housing 12, and defines a seed measurement area. The aperture and seed measurement area 18 is shown as a cross-hatched area in FIG. 3. In the embodiment shown, the aperture 18 has a width (measured in the "x" direction) and a depth (measured in the "z" direction) that is from about ten to about sixty times the mean diameter of a seed to be measured by the device 10. The housing 12 may be constructed of aluminum or any other suitable material. In one embodiment, at least some interior surfaces of the housing 12 can be darkly colored to minimize light reflection within the housing 12. Preferably, the measurement device 10 has a compact size and shape such that the device 10 is highly portable and easily positioned and mounted in a measurement position like that shown in FIG. 1. In the embodiment shown in FIGS. 1-3, for example, the device 10 may be about 360 mm (about 14.2 inches) long, about 98 mm (about 3.9 inches) tall, and about 72 mm (about 2.8 inches) wide. In this embodiment 10, the aperture 18 is about 58 mm by about 58 mm (about 2.3 inches by 2.3 inches). This aperture 18 is about ten times wider and deeper than the mean diameters of large seeds that can be measured with the device 10, such as kernels of corn or maize, and is about sixty times wider and deeper than the mean diameter of small seeds that can be measured with the device 10, such as canola seeds.

As shown in FIGS. 2 and 3, a light source 32 is provided on a first side of the aperture 18. The light source 32 can extend across substantially the full width of the aperture 18 as shown in FIG. 3. The light source 32 may be any source capable of providing sufficient light to permit the device 10 to adequately detect seeds of a pre-selected size as the seeds pass through the aperture 18, as described more fully below. One light source 32 suitable for use in the embodiment of the measurement device 10 shown in FIGS. 1 and 2 is an array of twenty-two (22) Kingbright Part No. L-934SRC-G red ultra bright LED lamps, available from Kingbright Corporation.

An image sensing device 40 is provided proximate to an end of the housing 12 that is opposite the light source 32. The image sensing device 40 may be any photo sensor that can adequately sense images of particles as the particles pass through the aperture 18. The term "image" is used herein to refer to an optical or visual representation or reproduction of an object, and may include, for example, a silhouette of an object. In the embodiment 10 shown in FIGS. 2 and 3, the image sensing device 40 is a charge-coupled device (CCD). The CCD sensor 40 includes a plurality of photosensitive semiconductor elements (pixels) that convert light into an electronic charge. One CCD available for use in the measurement device 10 is a TAOS Model No. TSL202, available from Texas Advanced Optoelectronic Solutions, Inc. The TSL202 CCD has two 64-pixel arrays.

Figure 4:
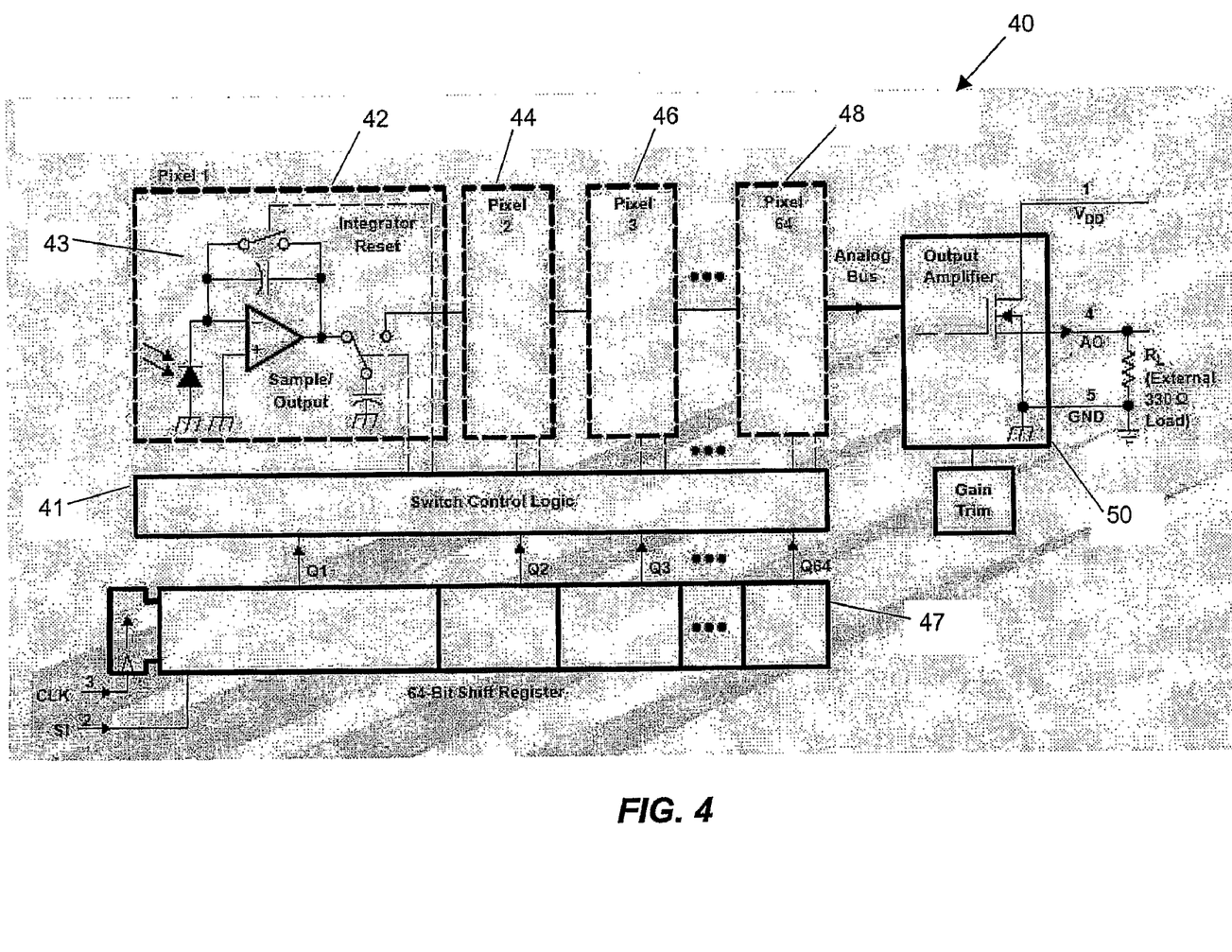
FIG. 4 is a block diagram showing the function of a charge-coupled device (CCD) for use in the measurement device of FIGS. 1-3.

The photo sensing operation of the CCD 40 is shown in FIG. 4. Light impinging on a pixel 42 generates a photocurrent that is then integrated by the active integration circuitry 43 associated with that pixel 42. During the integration period, a sampling capacitor connects to the output of the integrator through an analog switch. The amount of charge accumulated at each pixel 42, 44, 46, 48 is directly proportional to the light intensity on that pixel and the integration time. A shift register 47 inside the CCD sensor 40 sequentially shifts the accumulated charge from each pixel 42, 44, 46, 48, etc. to a neighboring pixel at regular clocked intervals. To extract an analog signal from the sensor, 128 clock impulses are required to read the entire register 43. Accordingly, each "packet" of charge is passed along the silicon substrate of the array 40. Once the input signal arrives at the last pixel 48 in the array, the charge is converted to a voltage and is amplified by an output amplifier 50 to produce an output analog signal "AO".

In the embodiment 10 shown in FIGS. 2 and 3, an objective lens 24 projects light images from the measuring area within the aperture 18 onto the image sensor 40. The position of the objective lens 24 is fixed relative to the image sensor 40. Objects within the aperture 18 block light from the light source, and prevent some light from reaching the image sensor 40. Accordingly, the objects appear to the image sensor as dark shapes or shadows. In one embodiment 10, the lens 24 may be a Componon-S 5,6/135 lens by Jos. Schneider Optische Werke GmbH, having a focal distance of 135 mm.

Before entering the objective lens 24, light from the light source 32 passes through a narrow slit 19 to the first mirror 20, and then traverses an extended optical path created by the first mirror 20 and an opposed second mirror 22. The first and second mirrors 20, 22 combine to form an optical distance extender. In the embodiment 10 shown, the two mirrors 20, 22 are substantially parallel to each other, and are inclined about 3 degrees from vertical. The second mirror 22 is positioned slightly below the first mirror 20. Preferably, each mirror 20, 22 has a reflection layer on its inside face, i.e. on that surface which faces the other mirror 20, 22. Having the reflection layers on the adjacent faces of the mirrors 20, 22 prevents image distortion that may otherwise occur from refraction by the glass substrate of the mirrors 20, 22. In the embodiment 10 shown the mirrors are about 65 mm tall, about 39.5 mm wide, and about 2 mm thick. In this arrangement, light from the light source 32 impinges on the reflective surface of the first mirror 20 and is reflected toward the reflective surface of the second mirror 22. The light repeatedly reflects back-and-forth between the mirrors 20, 22 until the light is reflected from a lower portion of the second mirror 22, passes beneath the first mirror 20, and enters the objective lens 24. In the embodiment 10 shown, light is reflected back-and-forth about 18 times before proceeding to the lens 24. In this way, the effective optical distance between the center of the aperture 18 and the lens 24 is substantially increased.

In the embodiment 10 shown in FIGS. 1 and 2, the physical distance $L_1$ between the lens 24 and the center of the aperture 18 is about 75 mm (about 3 inches). The total optical distance light must travel from the center of the aperture 18, between the mirrors 20, 22, and to the lens 24, however, is about 703 mm (about 27.7 inches). Accordingly, in the embodiment shown, the optical distance between the lens 24 and the center of the aperture 18 is about nine to about ten times greater than the actual physical distance $L_1$ between the lens 24 and aperture 18. In other embodiments, the ratio of the effective optical distance to the actual distance between the aperture 18 and lens 24 can be from about 5:1 to about 20:1. In yet another embodiment, the ratio may be about 7:1 to about 15:1, or more preferably, about 8:1 to about 12:1. The significance of this extended optical distance to the ability of the compact device 10 to acquire sharp images of particles or seeds and to thereby count the particles or seeds is discussed below. An increase in the effective optical distance requires a corresponding increase in the width of the slit 19 to accommodate a wider effective imaging region. In addition, an increase in the effective optical distance also requires a corresponding increase in the intensity of the light source 32. The effective optical distance can be varied by altering the distance between the mirrors 20, 22 and/or the inclination of the mirrors 20, 22.

Figure 5A:
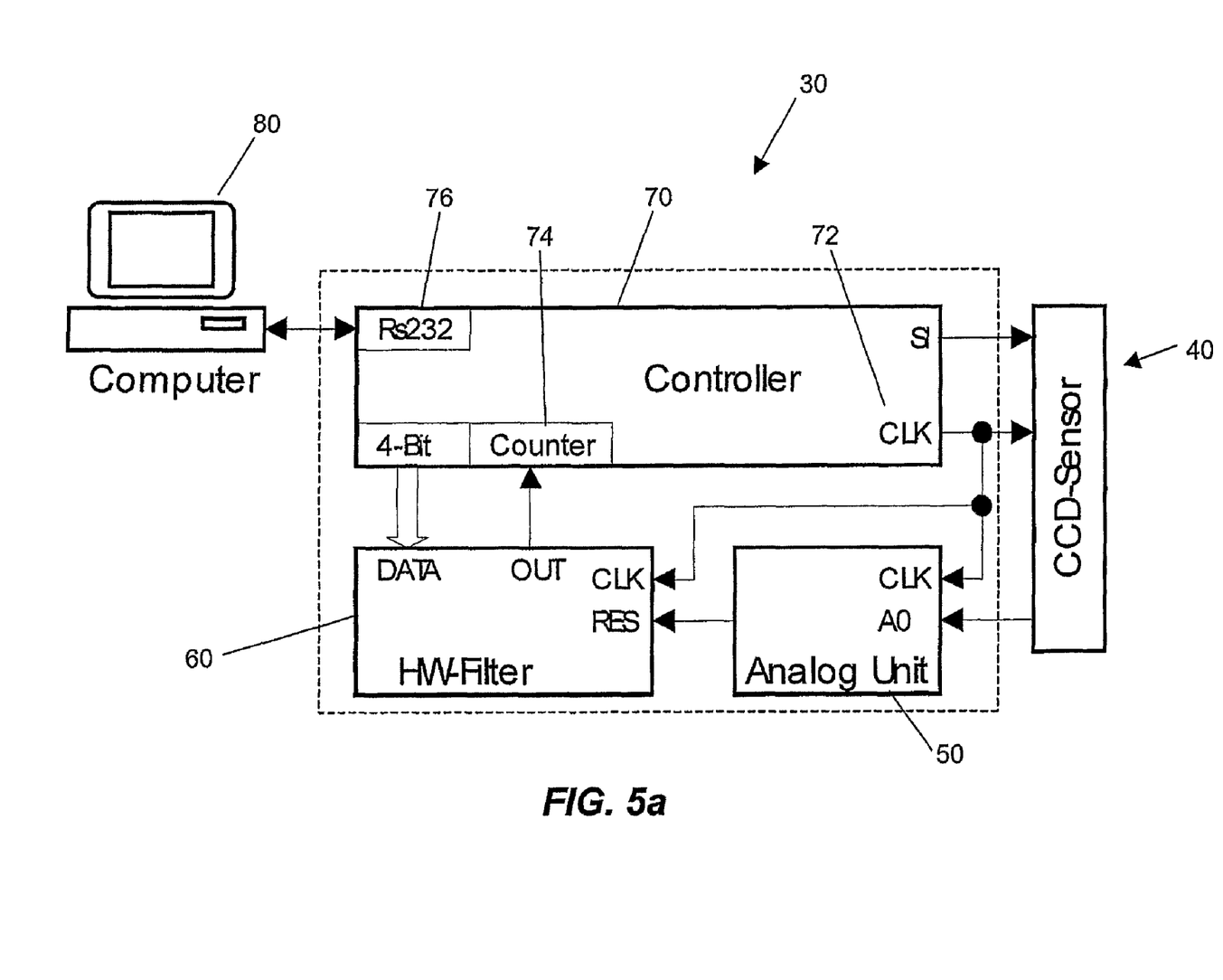
FIG. 5A is a block diagram showing the relationship between various electronic portions of the measurement device of FIGS. 1-3.

The measurement device 10 further includes an electronics module 30. As shown in FIG. 5a, the electronics module 30 includes an analog-to-digital converter 50, a hardware filter 60, and a microprocessor or micro controller 70. The analog output signal "AO" from the image sensor 40 is input to the converter 50. The converter 50 amplifies the analog signal, passes the analog signal through a comparator stage, and generates a corresponding digital signal (RES) that is sent to the filter 60. The filter 60 removes certain data (as described below) from the digital signal, and inputs a final filtered final signal (OUT) to the micro controller 70. In the embodiment 30 shown, the controller 70 includes a clock 72, a counter 74, and a data output port 76. The output port 76 may be an RS232 serial port for communicating data to a remote computer 80, for example. Alternatively, the output port 76 may be a wireless sending unit for communicating data to a remote wireless receiver or the like. The controller 70 controls operation of the image sensor 40, and provides clocking for the sensor 40, analog converter 50, and filter 60.

Figure 5B:
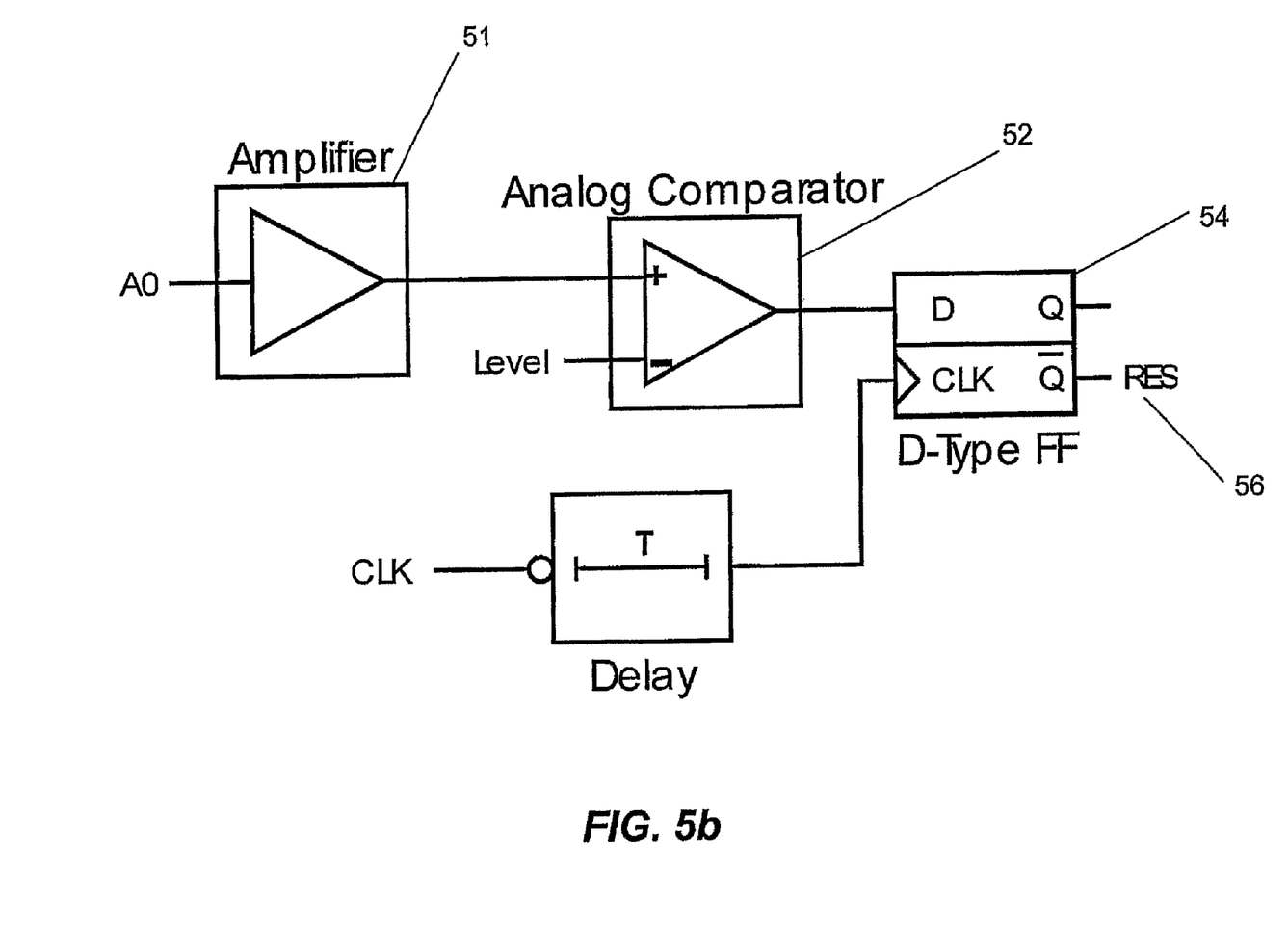
FIG. 5B is a block diagram showing details of an electronic analog unit for use in the measurement device of FIGS. 1-3.

The analog converter unit 50 is shown in FIG. 5b. An analog signal AO from the CCD sensor 40 is passed through an amplifier 51. The amplified signal is passed to an analog comparator 52, and is compared against a threshold voltage level to define a signal with only two levels (light and shadow). The analog comparator 52 converts the analog signal AO to a digital signal, which is then processed by a D-Type Flip Flop digital logic device 54. To eliminate spikes inherent in the architecture of the CCD sensor 40, the output signal from the comparator 52 is synchronized with the system clock of the CCD sensor 40. A brief time delay is required to permit measurement of the signal AO from the CCD sensor 40 at a stable level. The signal RES 56 from the output of the Flip Flop device 54 is representative all seeds in a scan (like that shown in FIG. 6).

Figure 5C:
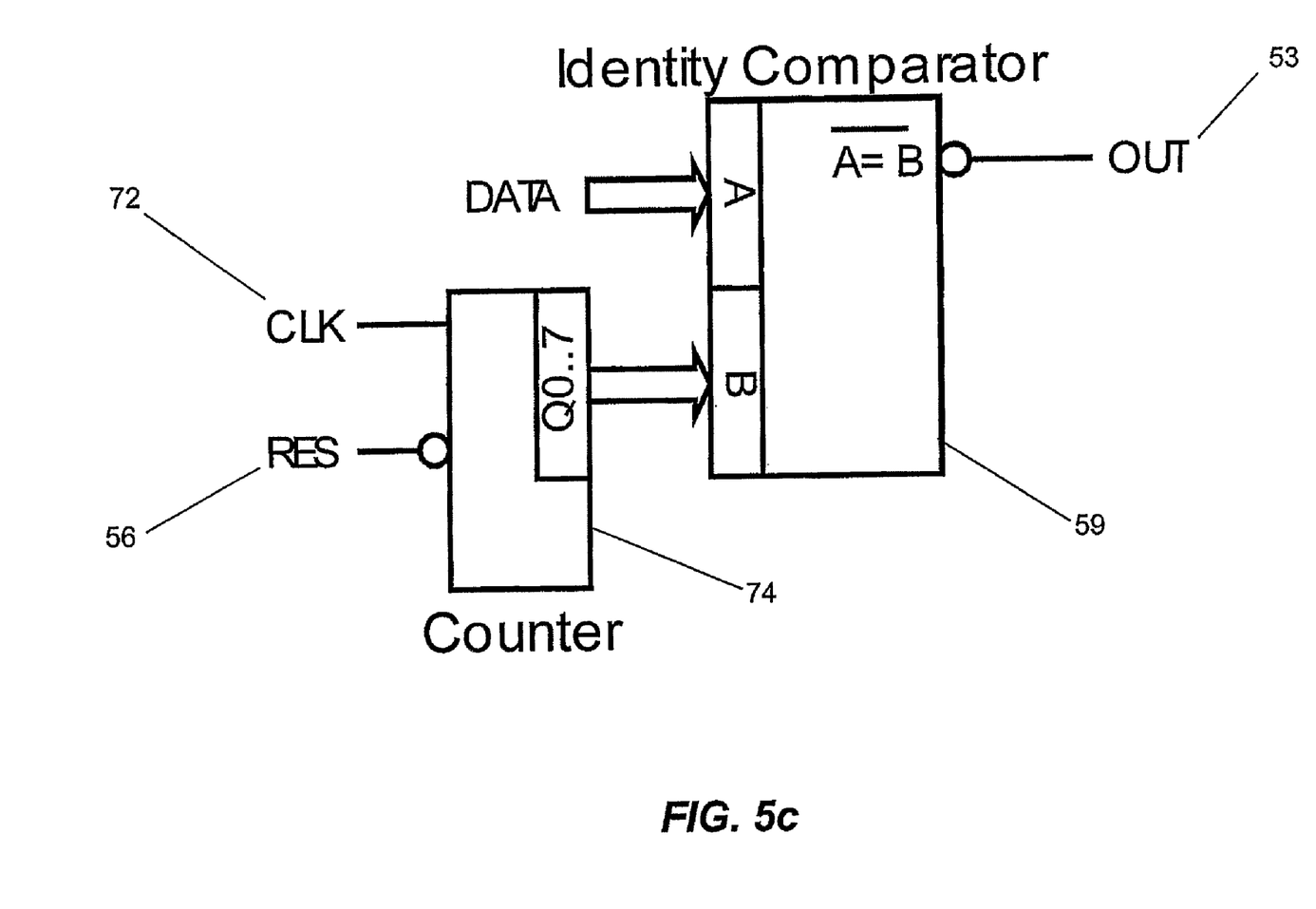
FIG. 5C is a block diagram showing details of an electronic filter and counter for use in the measuring device of FIGS. 1-3.

The signal RES 56 from the output of the Flip Flop device 54 is passed through a Hardware-Filter stage. Referring to FIG. 5c, the signal RES 56 is used to reset a free running counter 74 which is driven by the signal CLK 72. Each time a low-level signal is applied to the RES pin of the counter 74, the counter 74 resets and stops counting. When a high-level signal is received at the RES pin, the counter 74 begins counting from zero until the signal RES 56 switches back to a low level. When the counter value "B" reaches the same value as DATA "A", the identity comparator 59 generates a signal "OUT" 53 for exactly one clock cycle. If the counter value is reset before A=B, no signal is generated. A special condition occurs if DATA "A" is set to zero. In this case, the signal RES 56 and the signal OUT 53 are exactly the same, and no filtering results.

Figure 6:
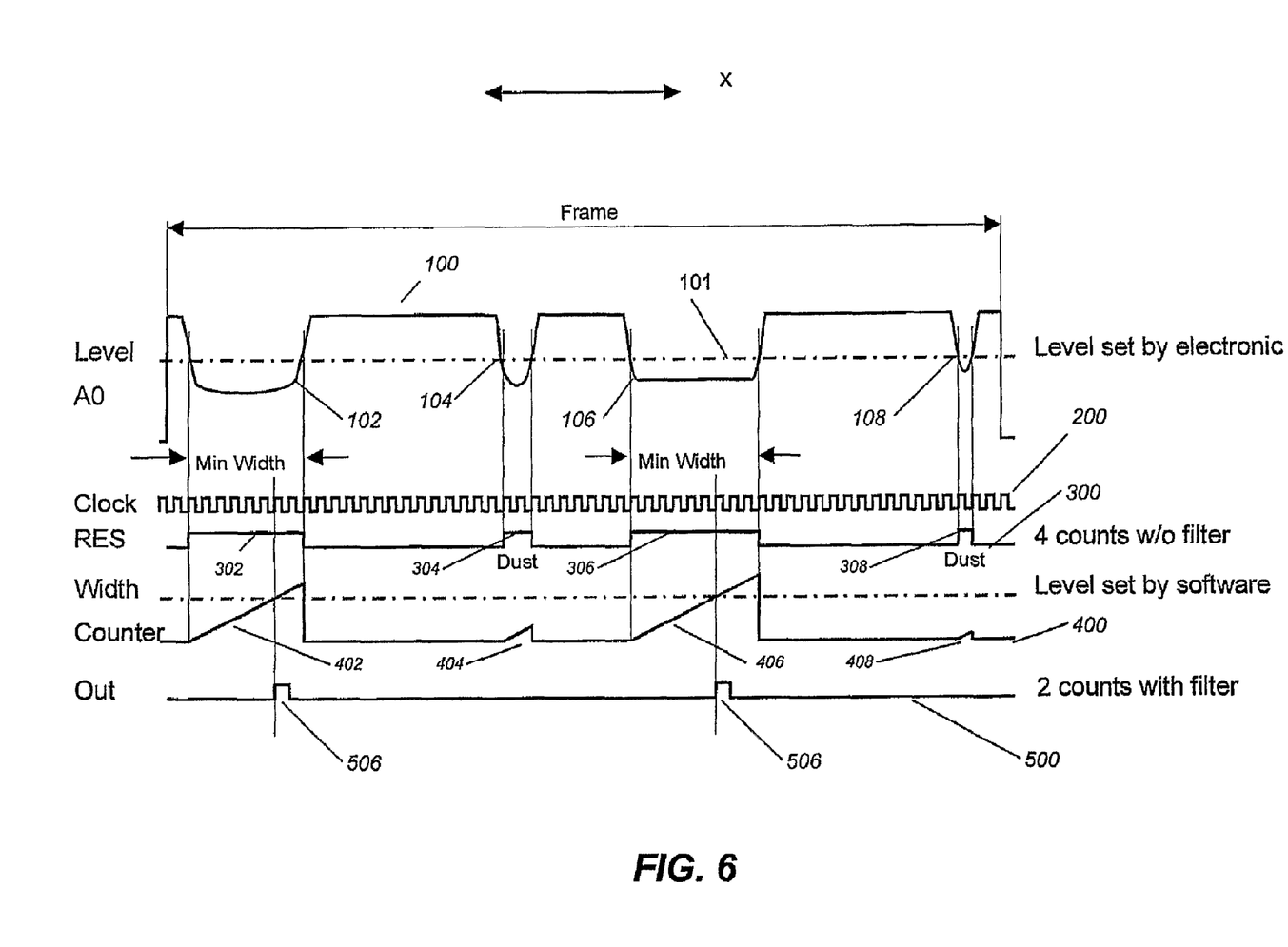
FIG. 6 is a graphic representation of an analysis of image data by the measurement device of FIGS. 1-3 to determine seed count and timing/frequency.

FIG. 6 illustrates the processing of data signals from the image sensor 100 by the electronics module 30. Analog signal 100 represents a typical output signal AO for a "frame" captured by the image sensor 40. A frame is an optical scan of the full width of the aperture 18. The analog signal 100 includes two relatively strong image pulses 102, 106, and two relatively weak image pulses 104, 108. The pulses indicate an absence of light striking the image sensor 40 during the scan due to a blocking object, and therefore appear as inverted pulses in analog signal 100 shown in FIG. 6. The strength of an image pulse is indicated by the pulse's width (duration as measured by clock 72), as well as the amplitude of the inverted pulse (the darkness of a captured image). The stronger image pulses 102, 106 represent captured images of two particles or seeds having substantial size, and the weaker images 104, 108 represent captured images of two smaller objects such as dust particles. A digitized signal 300 results when the analog data signal 100 is passed through the analog/digital converter 50. As shown in FIG. 6, the digitized signal 300 includes four square pulses 302, 304, 306, 308 corresponding to the inverted pulses 102, 104, 106 and 108 in the analog signal 100 that are below a predetermined threshold amplitude. Like the analog signal 100, the digitized signal 300 includes two stronger (wide) pulses 302, 306 that represent relatively large particles or seeds, and two relatively weak (narrow) pulses 304, 308 that represent small dust particles.

An increasing counter value 400 results when the digitized signal 300 is integrated, and includes two large saw tooth peaks 402, 406 corresponding to the areas under the wider square pulses 302, 306 in the digitized signal 300 and representing relatively large particles or seeds, and two smaller saw tooth peaks 404, 408 corresponding to the areas under the narrower square pulses 304, 308 that represent smaller dust particles. The filter 60 eliminates the smaller peaks 404, 408 because these peaks do not meet or exceed a pre-selected minimum pulse width, and generates a final output signal or count signal 500. The final output signal 500 includes two square pulses 502, 506 corresponding to the two large peaks 402, 406 in the integrated signal 400. The final output signal 500 is sent from the filter 60 to the counter 74. Alternatively, if the pre-selected filtering width of the filter 60 was set to zero, the digital signal 302 would be passed directly to the microprocessor 70, and the device 10 would count four rather than two seeds. Therefore, without the filter 60, small objects such as dust particles would be counted together with the seeds. After filtering, each sequence of a rising and a falling edges in the signal OUT 500 represents a seed in a scan, and can be counted by the internal counter 58 in the micro controller 70.

Figure 7:
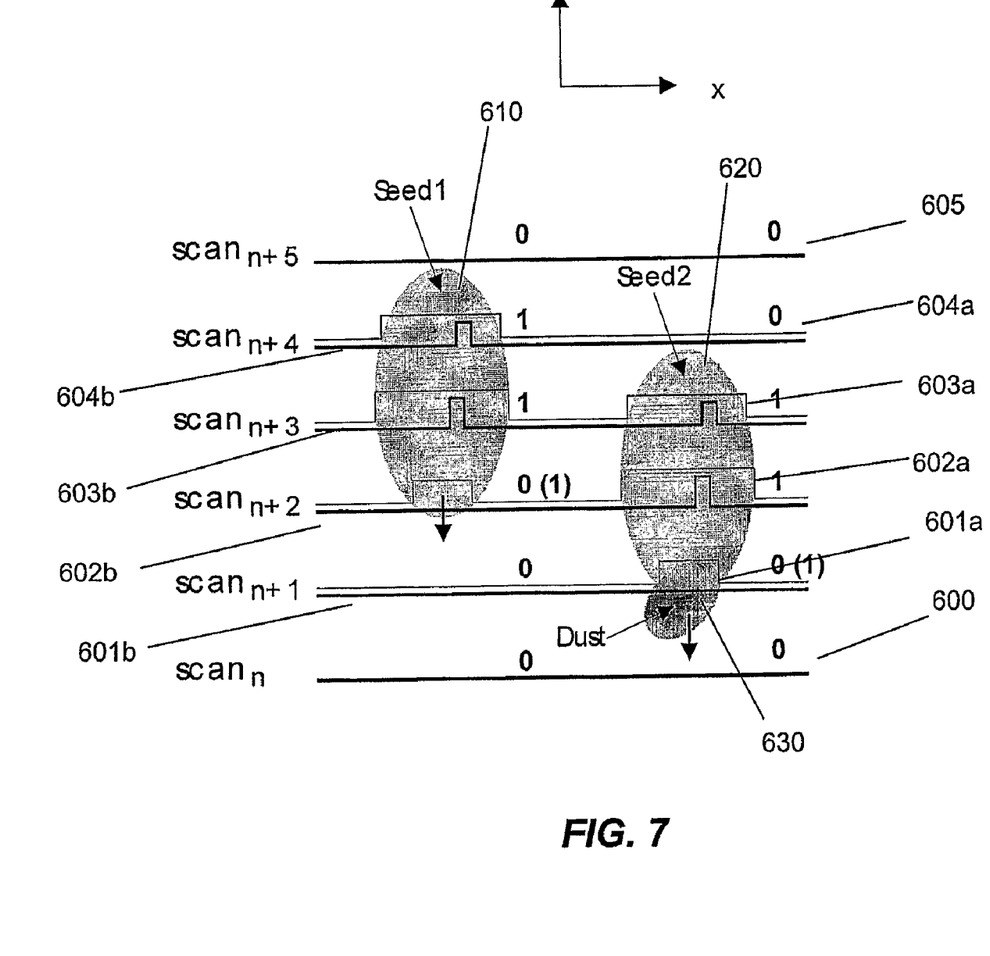
FIG. 7 is a graphic representation of a series of optical scans by the measurement device of FIGS. 1-3.

FIG. 7 shows how particles such as seeds are scanned and counted by the measuring device 10 as the particles pass through the aperture 18. In FIG. 7, each line 600-605 represents a signal corresponding to one of a series of successive optical scans of the aperture 18 by the image sensor 40 as two seeds 610, 620 and one particle of dust 630 substantially simultaneously pass through the aperture 18. In a first scan ("n"), the image sensor 40 detects no object images, and the final output signal 600 sent to the counter is a flat line including no countable pulses. In a second scan ("n+1"), the image sensor 40 has detected the dust particle 630 which has fallen into the sight path of the sensor 40 since completion of the first scan of the aperture. The second scan results in generation of a digitized signal 601a including a single narrow square pulse and a final flat output signal 601b. The output signal 601b includes no countable pulses because the single square pulse in the digitized signal 601a corresponding to the dust particle 630 is determined to be too narrow to represent a seed, and is filtered out of the final signal 601b.

In a third scan ("n+2"), the image sensor 40 detects the narrow bottom portion of a first seed 610 and a wide portion of the second seed 620, as indicated by the digitized signal 602a. Because of the relatively narrow width of the square pulse corresponding to the first seed 610 in the digitized signal 602a, this pulse is filtered out of the final signal 602b. Accordingly, the final signal 602b includes only a single pulse associated with the second seed 620. In a fourth scan ("n+3"), the image sensor 40 detects a wide portion of both the first and second seeds 610, 620. Accordingly, after filtering of the digitized signal 603a, the final signal 603b includes two count pulses associated with the two seeds 610, 620. At the time of the fifth scan ("n+4"), the second seed has passed the line of sight of the image sensor 40, and the sensor 40 only detects a wide portion of the first seed 610. Accordingly, the digitized signal 604a and final signal 604b each include a single square pulse associated with the first seed. At the time of the last scan ("n+5"), both seeds have passed the line of sight of the sensor 40, and the final signal 605 includes no count pulses. Table 1 below indicates how the image data represented by final signals 600, 601b, 602b, 603b, 604b, and 605 as shown in FIG. 7 is analyzed by the controller 70 and counter 74 to determine the number of seeds indicated by the data.

TABLE 1

| Optical Scan | Seed #1 Count | Seed #2 Count | Counter Value | Final Result (if result > 0, report count) |
|---|---|---|---|---|
| n − 1 | 0 | 0 | 0 | n/a |
| n | 0 | 0 | 0 | 0-0 = 0; no seed counted |
| n + 1 | 0 | 0 | 0 | 0-0 = 0; no seed counted |
| n + 2 | 0 | 1 | 1 | 0-1 = −1; no seed counted |
| n + 3 | 1 | 1 | 2 | 1-2 = −1; no seed counted |
| n + 4 | 1 | 0 | 1 | 2-1 = 1; seed #2 counted |
| n + 5 | 0 | 0 | 0 | 1-0 = 1; seed #1 counted |

In Table 1, the columns labeled "Seed #1 Count" and "Seed #2 Count" indicate the presence or absence of a count pulse for the first seed 610 and the second seed 620, respectively, in the final count signal for each optical scan "n" through "n+5". The counter controller value in Table 1 is the total number of count pulses included in each final count signal for each scan (i.e. the sum of columns "Seed #1 Count" and "Seed #2 Count"). The microprocessor controller 70 determines a final result for each scan as indicated in the last column of Table 1. For each optical scan, the processor 70 subtracts the current controller counter value for the present scan from the controller counter value for the immediately preceding scan. If the net result is a positive number (>0), the net result is reported as an affirmative seed count. As shown in Table 1, the series of scans shown in FIG. 7 correctly results in two final seed counts.

The seed count data is reported by the system microprocessor 70 to a remote computer 80 in a data stream that may having the following format:

| | |
|---|---|
| TIME COUNTS/SCAN CACHE\r\n | start of a new measurement |
| 00024A9C 01 00\r\n | first seed detected |
| 00024AEF 01 00\r\n | second seed |
| 00024B42 02 00\r\n | two seeds in the same scan |
| 00024B96 01 02\r\n | two more data sets to read |

In the above data stream, the time data is a 32-bit number (HEX-format) that corresponds to an absolute time since the measurement began. Accordingly, the captured data includes elapsed time intervals between successive seeds in a stream of seeds, and can be processed to calculate various aspects of seed frequency, such as average frequency and statistical frequency distribution. The time resolution may be about 400 microseconds, which equates to an image sensor scan rate of about 2500 Hz. At this scan rate, the measuring area defined by the aperture 18 is continually scanned 2500 times per second. The high frequency scan rate permits the device 10 to be capable of effectively measuring seeds or other particles flowing at a high flow rate. In one embodiment, the microprocessor 70 supplies the data to a remote computer 80 that generates a report of the measured parameters, including a statistical evaluation of the data.

As indicated by the above example, the device 10 is capable of counting multiple particles or seeds that substantially simultaneously pass through the aperture 18. Accordingly, the device 10 is able to accurately count seeds dispensed from a planting apparatus, though such an apparatus may at least occasionally feed two or more adjacent seeds at once (so-called "doubles"). Therefore, the device 10 is particularly useful in measuring the number and bulk weight of seeds planted by an apparatus within a given time period. Moreover, the device 10 is particularly useful in assessing the influence of various seed treatments on the planting accuracy of conventional planting devices. Furthermore, the device 10 is useful in determining optimal hardware settings for planting devices for certain seed types and treatment formulations, such as the spring tension on finger pick-up planters, the vacuum level and scraper position on vacuum planters, the influence of driving speed on planting accuracy, and the like, as is well known in the art.

Figure 8A:
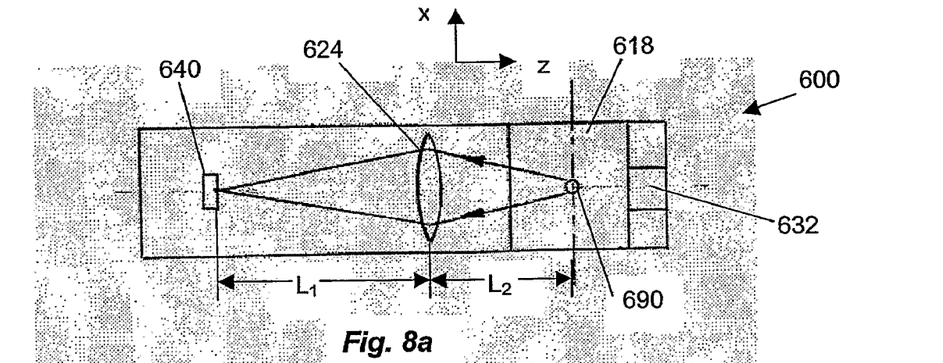
FIGS. 8a-8c are schematic representations of a measurement device similar to that of FIGS. 1-3, but having a shallow depth of field.
Figure 8B:
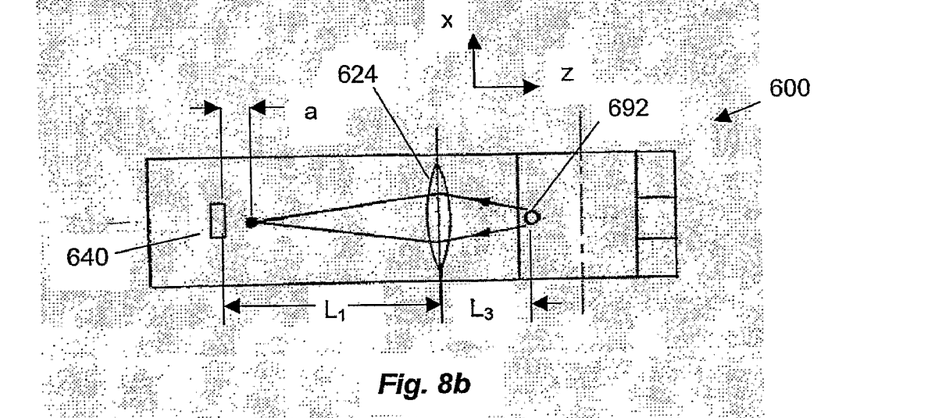
Figure 8C:
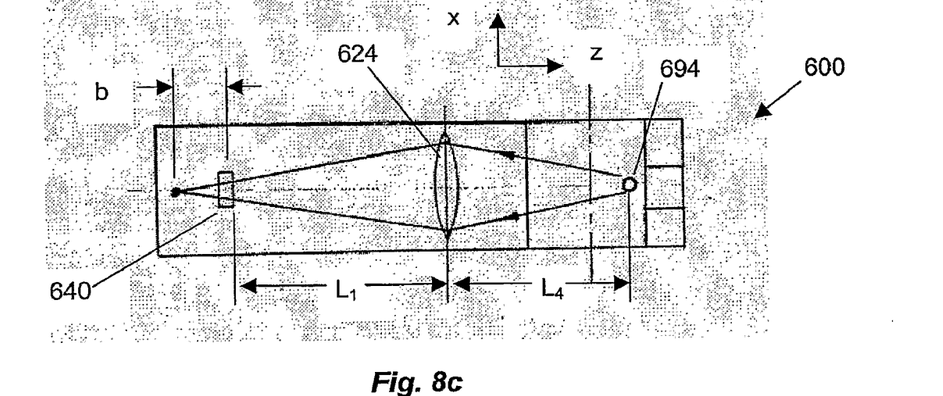

The extended optical distance created by the opposed mirrors 20, 22 can enhance the ability of the device 10 to detect a particle or seed passing through the aperture 18, irrespective of the particle's position within the aperture 18. To illustrate this effect, a compact optical measuring device 600 similar to the measuring device 10 described above, but without mirror 20 and mirror 22, is shown in FIGS. 8a-8c. Like the present device 10, the device 600 includes an aperture 618 defining a measurement area, a light source 632, a lens 624, and an image sensor 640. The lens 624 is fixed at a distance $L_2$ from the center of the aperture 618, and the image sensor 640 is fixed at a distance $L_1$ from the lens 624. The lens 624 and distances $L_1$ and $L_2$ are selected such that a precisely focused image of a seed 690 passing through the center of the aperture 618 is projected onto the image sensor 640. Therefore, there is substantially no blurring of a projected image of a seed or particle 690 when the seed or particle 690 passes substantially through the center of the aperture 618 as shown in FIG. 8a.

FIG. 8b shows the result when a seed or particle 692 passes through a forward portion of the aperture 618 that is substantially closer to the lens 624 than the center of the aperture 618. Because the seed or particle 692 is substantially nearer to the lens, the image of the seed or particle is projected to a point that is a distance "a" in front of the image sensor 640. As a result, the image that reaches the image sensor 640 is out of focus, and includes substantial blurring. A similar result occurs when a seed or particle 694 passes through a rear portion of the aperture 618 that is substantially farther from the lens 624 than the center of the aperture 618, as shown in FIG. 8c. In this case, the image of the seed or particle 694 is projected to a point that is a distance "b" behind the image sensor 640. As a result, the image that reaches the image sensor 640 is again out of focus, and includes substantial blurring. When an image of a seed is sufficiently blurred, a system like the device 10 described above is unable to recognize the blurred image as a seed. In photographic terms, the device 600 has a very shallow depth of field.

Figure 9A:
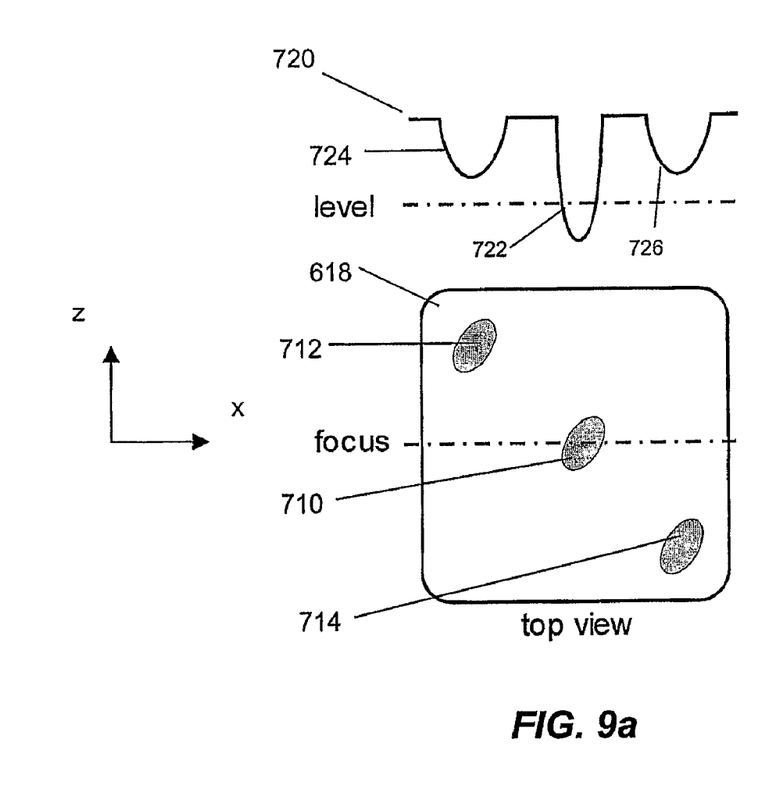
FIGS. 9a and 9b are graphic representations of the enhanced depth of field in the device of FIGS. 1-3.
Figure 9B:
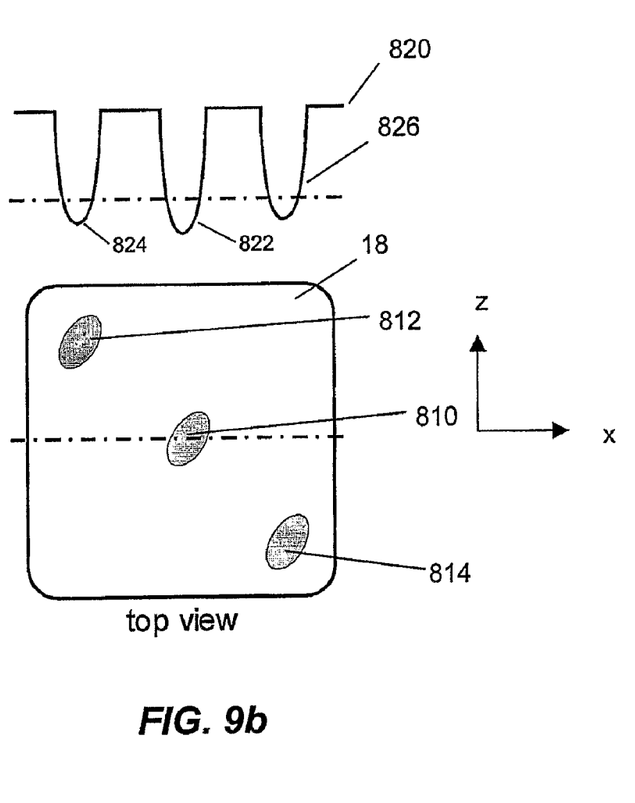

FIGS. 9a and 9b illustrate the effect of the depth of field on the quality of a sensed image, and resulting effect on the corresponding analog signal produced by the image sensor 40. FIG. 9a shows a scan result for a compact optical measuring device 600 like that described above and shown in FIGS. 8a-8c. In such a device 600, when a seed 710 passes through the center of the aperture 618, the image of the seed 710 is sharply focused on the image sensor 640, and a corresponding high-amplitude pulse 722 results in the image sensor's analog output signal 720. However, when a seed 712 passes substantially behind the center of the aperture 618 or a seed 714 passes substantially in front of the center of the aperture 618, the images projected on the image sensor 640 are substantially blurred. As a result, the corresponding pulses 724, 726 in the image sensor's analog output signal 720 have relatively low amplitudes that are less than the threshold amplitude $A_0$. Accordingly, the out-of-focus seeds 712 and 714 are not counted.

In contrast, by virtue of the extended optical distance between the aperture 18 and the lens 24 created by the opposed mirrors 20, 22 as described above, a device 10 according to the invention is capable of accurately counting particles or seeds irrespective of the positions of the particles or seeds within the broad aperture 18. The extended optical distance causes a substantially sharp image of a particle or seed to be projected onto the image sensor 40 by the lens 24 irrespective of the particle's or seed's position within the aperture. In other words, the mirrors 20, 22 combine to provide an enhanced depth of field such that images of objects positioned anywhere within the aperture 18 are projected onto the image sensor 40 as substantially sharp images. As shown in FIG. 9b, whether a seed 810 passes through the center of the aperture 18, whether a seed 812 passes through a rear portion of the aperture 18, or whether a seed 814 passes through a front portion of the aperture 18, the resulting analog output signal 820 includes corresponding high-amplitude pulses 822, 824, 826 that each exceed the threshold amplitude $A_0$. In other words, because of the substantial absence of blurring in the three seeds' images, the amplitudes of all three pulses generated by the image sensor 40 are similarly strong. Accordingly, the device 10 can accurately count all three seeds 810, 812, 814. Therefore, though the device 10 is compact in length and the system's optics 24 are fixed and non-adjustable, the device 10 can accommodate substantial variation in the distances between imaged objects and the lens 24 with little or no affect on counting accuracy. For example, in the embodiment 10 described above, the proximity of a seed to the lens 24 can vary ±29 mm without adversely affecting the ability of the device to detect the seed as the seed passes through the aperture 18. In other words, for a seed having an average diameter of about 1 mm, the device 10 can accommodate a total variation in seed position that is up to about 60 times the seed diameter. Accordingly, the device 10 is capable of accurately counting seeds in a stream of seeds, wherein the stream of seeds has a stream width and stream depth that are up to about 60 times the average seed diameter.

A compact counting device 10 like that described above is capable of counting seeds or particles in a dispersed stream of seeds or particles with a high degree of accuracy. For example, such a device 10 is believed to have a counting accuracy of at least about 99 percent, and as high as about 99.9 percent. Because the device 10 can accommodate widely distributed particles in a stream of particles, there is no need to funnel a dispersed stream into a narrow stream before the device receives the particles. For example, where the device 10 is used to measure the planting frequency of a conventional seed planting apparatus, the output of the apparatus can be fed directly through the aperture 18 without first funneling or otherwise constricting the flow of seeds from the planting apparatus.

Figure 10:
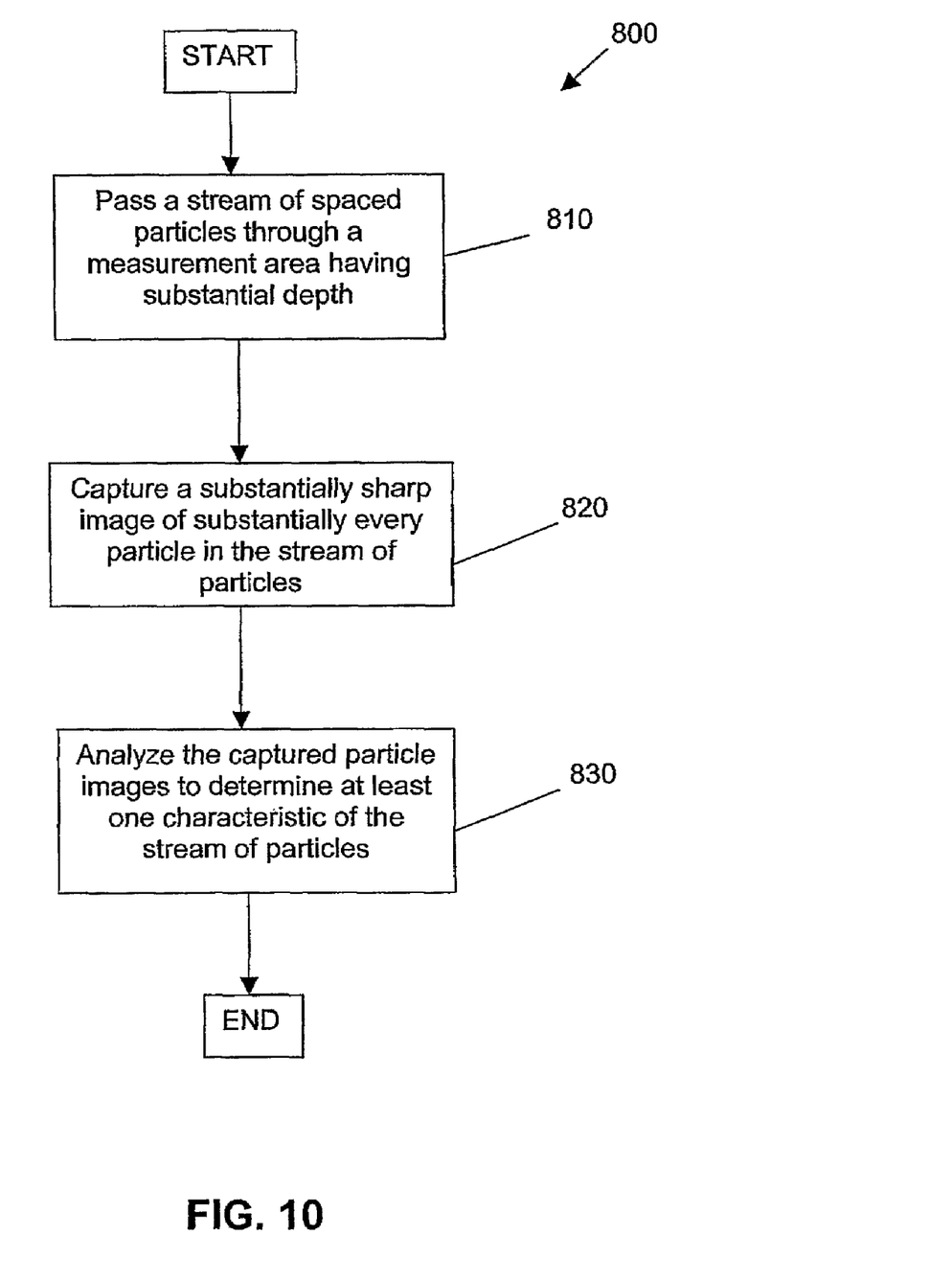
FIG. 10 is a flow diagram showing one embodiment of a method of measuring seed frequency and count according to the invention.

As shown in FIG. 10, the invention also includes a method 800 of measuring a characteristic of a stream of spaced seeds having a stream depth that is substantially greater than the seed size. The method includes passing a stream of seeds through a measurement area having a substantial depth 810. Preferably, the depth of the measurement area is equal to or greater than the stream depth, and may be up to about 58 times the seed diameter. The method 800 further includes capturing a substantially sharp image of substantially every seed in the stream of seeds as the seeds pass through the measurement area 820, irrespective of the position of a seed within the measurement area. Accordingly, a substantially sharp image is obtained of substantially every seed in the stream, whether a seed is located in the center of the stream or is positioned along or near a forward or rear edge of the stream. Lastly, the captured seed images are analyzed 830 to determine at least one characteristic of the stream of seeds. The determined characteristic may be a quantity of seeds in the stream of seeds, or a time period or frequency between successive particles in the stream of seeds, for example. Where the stream of seeds includes seeds and or other objects of at least two different sizes, the determined characteristic may be a number of seeds or objects that are larger than a particular size, for example.

The system 10 and method 800 are capable of measuring flows of particles greater than or equal to about 1 mm in diameter. Accordingly, the device 10 and method 800 are effective for measuring the count and frequency of small seeds such as canola seeds, or larger seeds such as kernels of corn or maize.

The above descriptions of various embodiments of the invention are intended to describe and illustrate various aspects of the invention, and are not intended to limit the scope of the invention thereto.

Persons of ordinary skill in the art will recognize that various changes and modifications can be made to the described embodiments without departing from the invention. For example, while the device and method have been described in terms of measuring characteristics of moving seeds, the device also may be used to measure streams of other objects or particles. All such changes and modifications are intended to be within the scope of the appended claims.

The invention claimed is:

1. A seed counting system comprising:
   (a) an imaging region;
   (b) an image sensing device;
   (c) a lens between the imaging region and the image sensing device; and
   (d) an optical distance extender between the imaging region and the lens, whereby the effective optical distance between the imaging region and the lens is at least about five times the physical distance between the imaging region and the lens.

2. The seed counting system according to claim 1 wherein the optical distance extender comprises a plurality of mirrors.

3. The seed counting system according to claim 1 wherein the optical distance extender comprises a pair of substantially parallel mirrors.

4. The seed counting system according to claim 1 wherein the image sensing device comprises a charge-coupled device.

5. The seed counting system according to claim 1 wherein the imaging region has depth that is from about ten to about sixty times the diameter of a seed to be counted by the system.

6. A particle frequency measuring apparatus comprising:
   (a) a housing having an aperture therein;
   (b) an image sensor located on a first side of the aperture;
   (c) a light source on a second side of aperture opposite the first side;
   (d) a lens for focusing light from the light source onto the image sensor, the lens being positioned a first distance from the aperture; and
   (e) a pair of opposed mirrors between the lens and the aperture;
   (f) whereby light emitted from the light source is reflected between the mirrors such that light from the light source must travel a distance that is at least about five times the first distance before reaching the lens.

7. The apparatus according to claim 6 wherein the image sensor comprises a charge-coupled device.

8. The apparatus according to claim 6 wherein the pair of opposed mirrors are substantially parallel to each other.

9. The apparatus according to claim 6 wherein the pair of opposed mirrors includes a pair of opposed mirror faces, and wherein each of the opposed mirror faces comprises a mirroring material thereon.

10. The apparatus according to claim 6 further comprising an analog-to-digital converter for converting an analog data signal from the image sensor to a digital signal.

11. The apparatus according to claim 10 further comprising a filter for filtering the digital signal.

12. The apparatus according to claim 6 further comprising a microprocessor configured to count images sensed by the image sensor.

13. The apparatus according to claim 6 further comprising a microprocessor configured to measure an elapsed time period between successive images acquired by the image sensor.

14. A method of measuring a characteristic of a stream of spaced particles having a stream depth that is about ten to about sixty times greater than the particle size, the method comprising:
   (a) passing the stream of particles through a measurement area having a depth that is equal to or greater than the stream depth;
   (b) capturing a substantially focused image of substantially every particle in the stream of particles as the stream of particles passes through an aperture, irrespective of the position of a particle within the measurement area; and
   (c) analyzing the captured particle images to determine at least one characteristic of the stream of particles.

15. The method according to claim 14 wherein the characteristic is a quantity of particles in the stream of particles.

16. The method according to claim 14 wherein the characteristic is a time period between successive particles in the stream of particles.

17. The method according to claim 14 further comprising generating a digital signal that is representative of the size and sharpness of the image of each particle in the stream, and wherein analyzing the captured particle images comprises analyzing the digital signal.

18. The method according to claim 14 wherein the stream of particles comprises a stream of particles having at least two different sizes, and the characteristic is the number of particles in the stream that are equal to or larger than a preselected size.

19. The method according to claim 14 wherein the stream of particles comprises a stream of particles having at least two different sizes, and the characteristic is the frequency of particles in the stream that are equal to or larger than a preselected size.

20. A compact seed counting apparatus comprising means for acquiring a substantially sharp image of a seed in a substantially dispersed stream of seeds having a mean axis of flow, wherein the means is capable of acquiring a substantially sharp image of each seed in the stream irrespective of a distance of a seed from the axis of flow wherein the means for acquiring a substantially sharp image comprises:
(a) an image sensor;
(b) a lens for focusing seed images on the image sensor, the lens being positioned between the image sensor and the mean axis of flow, wherein the lens is a first distance from the mean axis of flow; and
(c) a plurality of mirrors arranged to provide an effective optical distance between the mean axis of flow and the lens that is about at least five times greater than the first distance.

21. The compact seed counting apparatus according to claim 20 wherein the image sensor comprises a charge-coupled device.

* * * * *